US006717791B1

(12) United States Patent
Wiesinger

(10) Patent No.: US 6,717,791 B1
(45) Date of Patent: Apr. 6, 2004

(54) HIGH-VOLTAGE CIRCUIT BREAKER WITH INTERRUPTER UNIT

(75) Inventor: Claudia Wiesinger, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/743,417

(22) PCT Filed: Jun. 30, 1999

(86) PCT No.: PCT/DE99/02031

§ 371 (c)(1),
(2), (4) Date: Aug. 2, 2002

(87) PCT Pub. No.: WO00/04565

PCT Pub. Date: Jan. 27, 2000

(30) Foreign Application Priority Data

Jul. 14, 1998 (DE) ........................................ 198 32 709

(51) Int. Cl.[7] ................................................ H02H 1/00
(52) U.S. Cl. ....................... 361/123; 218/106; 218/157
(58) Field of Search .............................. 361/2, 14, 115, 361/116, 123; 218/10, 11, 13, 15, 17–19, 51–54, 63, 76, 77, 81, 85, 89, 90, 99, 103, 105, 106, 108, 116, 151, 157, 134, 135

(56) References Cited

U.S. PATENT DOCUMENTS 3,941,962 A * 3/1976 Thaler ......................... 218/63
4,236,053 A 11/1980 Sasaki et al. ........... 200/144 R
4,471,187 A * 9/1984 Sturzenegger et al. ........ 218/51
4,689,453 A * 8/1987 Horvath et al. ............... 218/68
5,717,183 A * 2/1998 Lehmann et al. ............. 218/90
5,828,026 A * 10/1998 Bruhl et al. ................ 218/150

FOREIGN PATENT DOCUMENTS

| | | | |
|---|---|---|---|
| DE | 2350890 | 10/1973 | .......... H01H/33/74 |
| DE | 2819599 | 11/1979 | .......... H01H/33/70 |
| DE | 29 47 957 | 11/1979 | .......... H01H/33/88 |
| DE | 30 09 504 A1 | 3/1980 | .......... H01H/33/91 |
| DE | 32 11 272 A1 | 3/1982 | ......... H01H/33/915 |
| DE | G 93 14 779.1 | 9/1993 | .......... H01H/33/74 |
| EP | 0 075 668 | 7/1982 | ......... H01H/33/915 |
| FR | 1334851 | 7/1963 | ............ H02C/1/00 |

* cited by examiner

*Primary Examiner*—Ronald W. Leja
(74) *Attorney, Agent, or Firm*—Morrison & Foerster LLP

(57) ABSTRACT

In a high-voltage power breaker having an interrupter unit which is enclosed, with a gap, by a gas-tight housing (16) filled with quenching gas, the interrupter unit has two arcing contacts (1,2) between which an arc produced during disconnection is blown by means of a blowing device (5) with a quenching gas which afterwards at least partially flows away in the axial direction of the arcing contacts (1,2). In this case, the invention provides for a flow deflection device (9,10,11), which is not the same as the blowing device (5) and which deflects the quenching gas flow radially outward through more than 90°, to be provided in the outlet-flow area of the quenching gas.

8 Claims, 1 Drawing Sheet

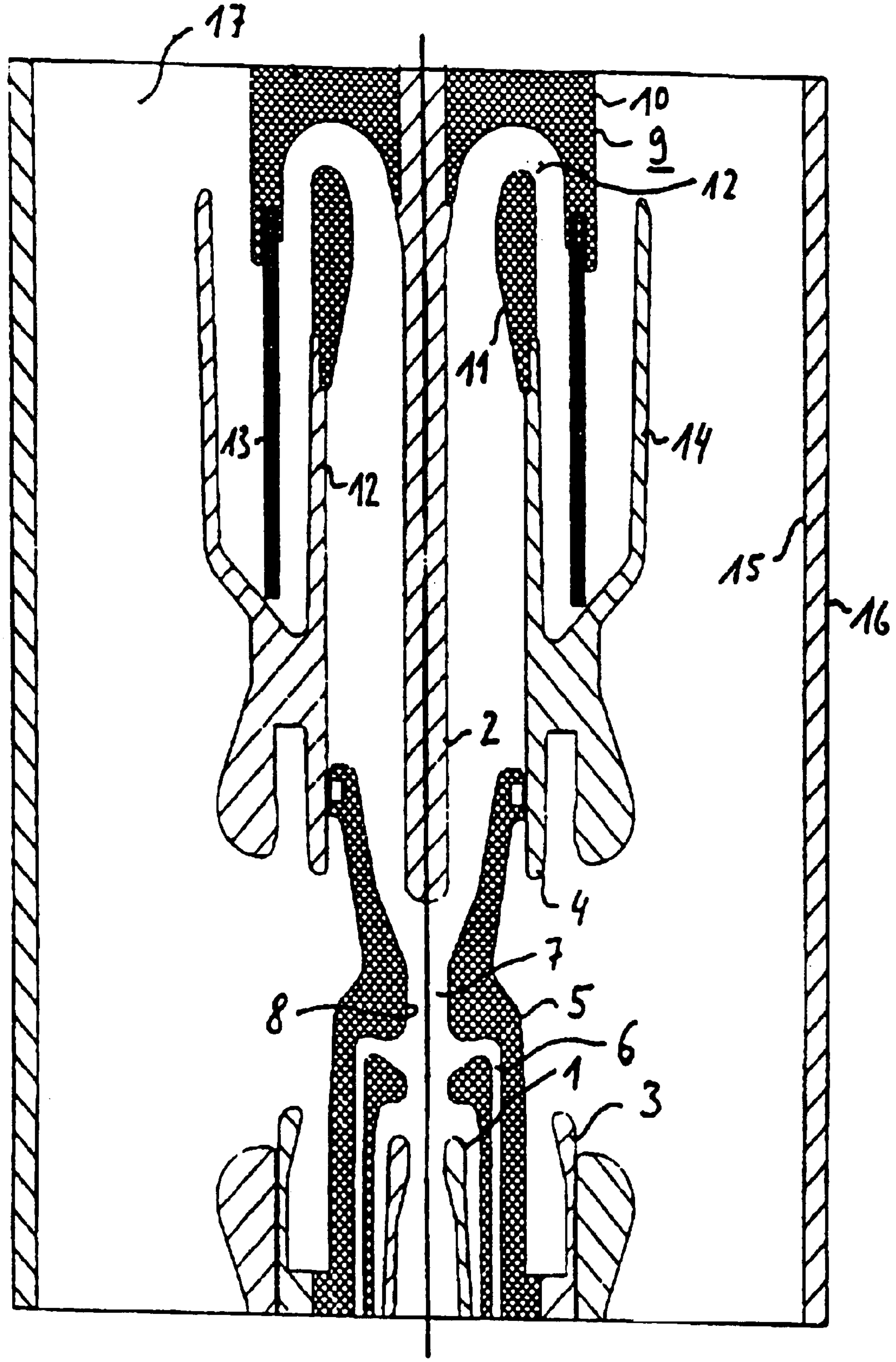
17
10
9
12
11
13
14
12
15
16
2
4
7
5
8
6
1
3

HIGH-VOLTAGE CIRCUIT BREAKER WITH INTERRUPTER UNIT

This application claims priority to International Application No. PCT/DE99/02031 which was published in the German language on Jan. 27, 2000.

TECHNICAL FIELD OF THE INVENTION

The invention relates to a high-voltage power breaker having an interrupter unit, and in particular, to a high-voltage power breaker having an interrupter unit which is enclosed, with a gap, by a gas-tight housing filled with quenching gas.

BACKGROUND OF THE INVENTION

Such a high-voltage power breaker is known, for example, from German Utility Model G 93 14 779.1 and from German Laid-Open Specification DE 29 47 957.

In a high-voltage power breaker such as this, an arc produced between the arcing contacts is normally blown with a quenching gas, for example sulfur hexafluoride, which may also be used as a quenching gas. This cools the arcing area so that an arc which is quenched at the current zero crossing of a current to be switched does not restrike when the voltage returns.

The quenching gas which flows to the arc in this case is heated severely in the arcing area and afterwards at least partially flows away, in the axial direction of the arcing contacts, into an expansion area. The expansion area is bounded by the housing of the power breaker, which housing is composed, for example, of a porcelain or a composite insulating material.

Since the quenching gas flowing away is highly ionized by the influence of the arc, it is necessary to prevent or reduce contamination on the inner wall of the housing from the hot quenching gas. For this reason, it is common to provide cooling devices for the quenching gas in the form of bodies (mesh coolers) having through-openings.

However, it has been found that the quenching gas can still contaminate the inner wall of the housing even after passing through such a cooling device, for example by conductive layers being deposited on the inner wall of the housing.

SUMMARY OF THE INVENTION

In one embodiment of the invention, there is a high-voltage power breaker, an interrupter unit which is enclosed, with a gap, by a gas-tight housing filled with quenching gas, the interrupter unit, two arcing contacts, at least one of which can be driven during a switching operation and an arc produced between the arcing contacts during disconnection being blown by a blowing device with the quenching gas, which afterwards at least partially flows away in the axial direction of the arcing contacts, a flow deflection device provided in an outlet-flow area of the quenching gas, in order to deflect the quenching gas flow through more than 90° radially outward, and a partition wall to separate the quenching gas flow before the deflection from the quenching gas flow after the deflection; wherein, a nozzle body is arranged on the partition wall, and, together with the flow deflection device, forms a nozzle constriction.

In one aspect of the invention, the nozzle body has a convex area, which faces a concave area of the flow deflection device.

In another aspect of the invention, the flow direction device and the partition wall are cylindrically symmetrical, and are arranged coaxially with respect to the arcing contacts.

In still another aspect of the invention, a quenching gas cooling device in the form of a body having through-openings is arranged downstream of the deflection device.

In yet another aspect of the invention, the quenching gas cooling device is cylindrically symmetrical.

In another aspect of the invention, another deflection device for the quenching gas is arranged downstream of the quenching gas cooling device.

In yet another aspect of the invention, the flow deflection device and/or the nozzle body are/is composed of an insulating material, such as PTFE or PVDF (polyvinylidene fluoride).

In still another aspect of the invention, a further deflection device for the quenching gas is arranged downstream of the quenching gas cooling device.

In another aspect of the invention, the flow deflection device and/or the nozzle body are/is composed of an insulating material, in particular PTFE or PVDF (polyvinylidene fluoride).

BRIEF DESCRIPTION OF THE DRAWINGS

The invention will be described in the following text with reference to an exemplary embodiment which is illustrated in the drawing:

FIG. 1 shows a longitudinal section of the interrupter unit of a high-voltage power breaker.

DETAILED DESCRIPTION OF THE INVENTION

The invention relates to a high-voltage power breaker having an interrupter unit which is enclosed, with a gap, by a gas-tight housing filled with quenching gas, with the interrupter unit having two arcing contacts, at least one of which can be driven during a switching operation and with any arc which is produced between the arcing contacts during disconnection being blown by means of a blowing device with the quenching gas, which afterwards at least partially flows away in the axial direction of the arcing contacts and with a flow deflection device which is not the same as the blowing device, being provided in the outlet-flow area of the quenching gas.

The present invention provides a power breaker of the type mentioned initially, in which the quenching gas is sufficiently cooled after blowing the arc and before flowing away into the expansion area.

According to the invention, this can be achieved by the flow deflection device deflecting the quenching gas flow radially outward through more than 90°.

Flow deflection devices for such high-voltage power breakers are conventionally known and used for the purpose of protecting components located in the outlet-flow area of the quenching gas against the direct influence of the corrosive, heated quenching gas. Until now, less attention has been paid to the contamination of the inner wall of the power-breaker housing, since the quenching gas was normally sufficiently cooled on its way through the expansion area.

Since the development of high-voltage power breakers has in the meantime led to higher switching ratings, and thus to greater cooling power levels and to a correspondingly more severely heated quenching gas flow, such simple deflection of the quenching gas is no longer sufficient for high switching ratings.

The deflection, according to the invention, of the quenching gas through more than 90° means that the quenching gas is not directed radially outward onto the inner wall of the housing but, after flowing into the flow deflection device, flows, at least partially with a component in the rearward direction, axially out of this flow deflection device. The flow path before it meets the inner wall of the housing is thus considerably lengthened. This thus results in adequate cooling of the quenching gas before it meets the inner wall of the housing.

One advantageous refinement of the invention provides for a nozzle body to be integrated in the flow deflection device.

The integration of a nozzle body in the flow deflection device accelerates the quenching gas flow. Firstly, this results in the quenching gas being carried out of the arcing area quickly and not being choked in the flow deflection device.

Secondly, the quenching gas flows out of the flow deflection device at high speed and can thus be distributed effectively in the expansion area. The nozzle body results in deliberate deflection of the quenching gas flow thus preventing vortices from being formed and the quenching gas from being choked in the flow deflection device.

A further advantageous refinement of the invention provides for the flow deflection device to be cylindrically symmetrical and to be arranged coaxially with respect to the arcing contacts.

A cylindrically symmetrical configuration of the flow deflection device is particularly advantageous from both the manufacturing and design points of view.

A further advantageous refinement of the invention provides for the nozzle body to be attached to a cylindrical partition wall which separates the quenching gas flow before deflection from the quenching gas flow after deflection.

Such a partition wall prevents the quenching gas flow before deflection from coming into contact with the quenching gas flow after deflection, which could lead to vortices being formed, to mixing and to subsequent heating of the quenching gas downstream of the flow deflection device. All the quenching gas is intended to be forced through the flow deflection device.

The invention can advantageously also be refined by the nozzle body having a convex area, which faces a concave area of the flow deflection device, and by an annular nozzle constriction being formed between these areas.

This design forms a simple and effective nozzle, in order to accelerate the quenching gas flow.

A further advantageous refinement of the invention provides for a quenching gas cooling device in the form of a body having through-openings to be arranged downstream of the deflection device, in the sense of the quenching gas flow.

Such a quenching gas cooling device cools the quenching gas flow further. In the context of the present application, the term cooling is also intended to cover deionization of the quenching gas.

A quenching gas cooling device can, for example, be provided by a spongy metallic body which can, in the preferred embodiment, be cylindrically symmetrical. It is also possible to provide for a further deflection device for the quenching gas to be arranged downstream of the quenching gas cooling device.

This results in the quenching gas being cooled further be ore meeting the inner wall of the housing.

It is particularly advantageous to provide for the flow deflection device and/or the nozzle body to be composed of an insulating material, in particular, PTFE or PVDF.

Particularly if the insulating material is PTFE (polytetrafluoroethylene), this insulating material can also add additional gas where it meets the ionized quenching gas, thus cooling the quenching gas.

FIG. 1 illustrates an interrupter unit of a high-voltage power breaker with a first arcing contact 1 which can be driven, opposite a second, stationary arcing contact 2. The first arcing contact 1 is surrounded coaxially by a first rated current contact 3, which can likewise be driven, while the second arcing contact 2 is coaxially surrounded by a stationary, second rated current contact 4.

An insulating material nozzle 5, which has a channel 6 in the form of an annular gap, is firmly connected to the first arcing contact 1.

During disconnection, an arc is struck in the arcing area 7 between the arcing contacts 1,2 and heats the quenching gas located there. As long as the nozzle constriction 8 of the insulating material nozzle 5 is still blocked by the stationary arcing contact 2, a high quenching gas pressure builds up in the arcing area 7, as a result of which the quenching gas is forced into the channel 6 and, through this channel, into a heating area which is not illustrated.

At the current zero crossing of the current to be switched, the arc is quenched for a short time, and the quenching gas stored in the heating area can flow back through the channel 6 to the arcing area 7, where it blows the arc.

Furthermore, a mechanical compression apparatus for the quenching gas can also be provided, ensuring that the quenching gas blows the arc particularly when the arc current is weak.

As soon as the arcing contact 1 which can be driven has been moved together with the insulating material nozzle 5 away from the stationary arcing contact 2, sufficiently that the nozzle constriction 8 is no longer blocked by the second arcing contact, the quenching gas starts to flow in the axial direction out of the insulating material nozzle 5 in the direction of the second arcing contact. A portion of the quenching gas flows away through the hollow first arcing contact in the opposite direction.

The quenching gas flow in the direction of the stationary arcing contact 2 carries the quenching gas to a flow deflection device 9, which has a first PTFE body 10 and a nozzle body 11, likewise composed of PTFE. The nozzle body is mounted on a partition wall 12 which coaxially surrounds the stationary arcing contact 2.

A nozzle constriction 12 in the form of an annular gap is formed between the nozzle body 11 and the body 10. This is where the quenching gas flow has its highest speed after which it is expanded as the nozzle cross section widens, which leads to a reduction in the speed there and to it arriving at the quenching gas cooling device 13 at a reduced speed. The quenching gas cooling device 13 is formed by a hollow cylindrical metal mesh, which has through-openings for the quenching gas. The quenching gas cooling device can advantageously be composed of copper, for example.

In the exemplary embodiment described, the flow deflection device 9 deflects the quenching gas flow through about 180°. The quenching gas then flows tangentially along the quenching gas cooling device, and partially through it. It thus passes through the quenching gas cooling device at a reduced radial speed, thus ensuring effective cooling.

Behind the quenching gas cooling device 13, a further deflection device 14 is provided, in the form of a cylindrical partition wall, which prevents the quenching gas from flowing away directly out of the quenching gas cooling device 13 to the inner wall 15 of the housing 16. The quenching gas can thus enter the expansion area 17 in the pre-cooled state and at a reduced radial speed.

What is claimed is:

1. A high-voltage power breaker, comprising:

an interrupter unit which is enclosed, with a gap, by a gas-tight housing filled with quenching gas, the interrupter unit comprising:

two arcing contacts, at least one of which can be driven during a switching operation and an arc produced between the arcing contacts during disconnection being blown by a blowing device with the quenching gas, which afterwards at least partially flows away in the axial direction of the arcing contacts;

a flow deflection device provided in an outlet-flow area of the quenching gas, in order to deflect the quenching gas flow through more than 90° radially outward;

and a partition wall to separate the quenching gas flow before the deflection from the quenching gas flow after the deflection; wherein a nozzle body is arranged on the partition wall, and, together with the flow deflection device, forms a nozzle constriction.

2. The high-voltage power breaker as claimed in claim 1, wherein the nozzle body has a convex area, which faces a concave area of the flow deflection device.

3. The high-voltage power breaker as claimed in claim 2, wherein the flow direction device and the partition wall are cylindrically symmetrical, and are arranged coaxially with respect to the arcing contacts.

4. The high-voltage power breaker as claimed in claim 1, further comprising a quenching gas cooling device in the form of a body having through-openings is arranged downstream of the deflection device.

5. The high-voltage power breaker as claimed in claim 4, wherein the quenching gas cooling device is cylindrically symmetrical.

6. The high-voltage power breaker as claimed in claim 5, wherein another deflection device for the quenching gas is arranged downstream of the quenching gas cooling device.

7. The high-voltage power breaker as claimed in claim 1, wherein the flow deflection device and/or the nozzle body are/is composed of an insulating material.

8. The high-voltage power breaker as claimed in claim 4, a further deflection device for the quenching gas is arranged downstream of the quenching gas cooling device.

* * * * *